United States Patent Office 2,810,064
Patented Oct. 15, 1957

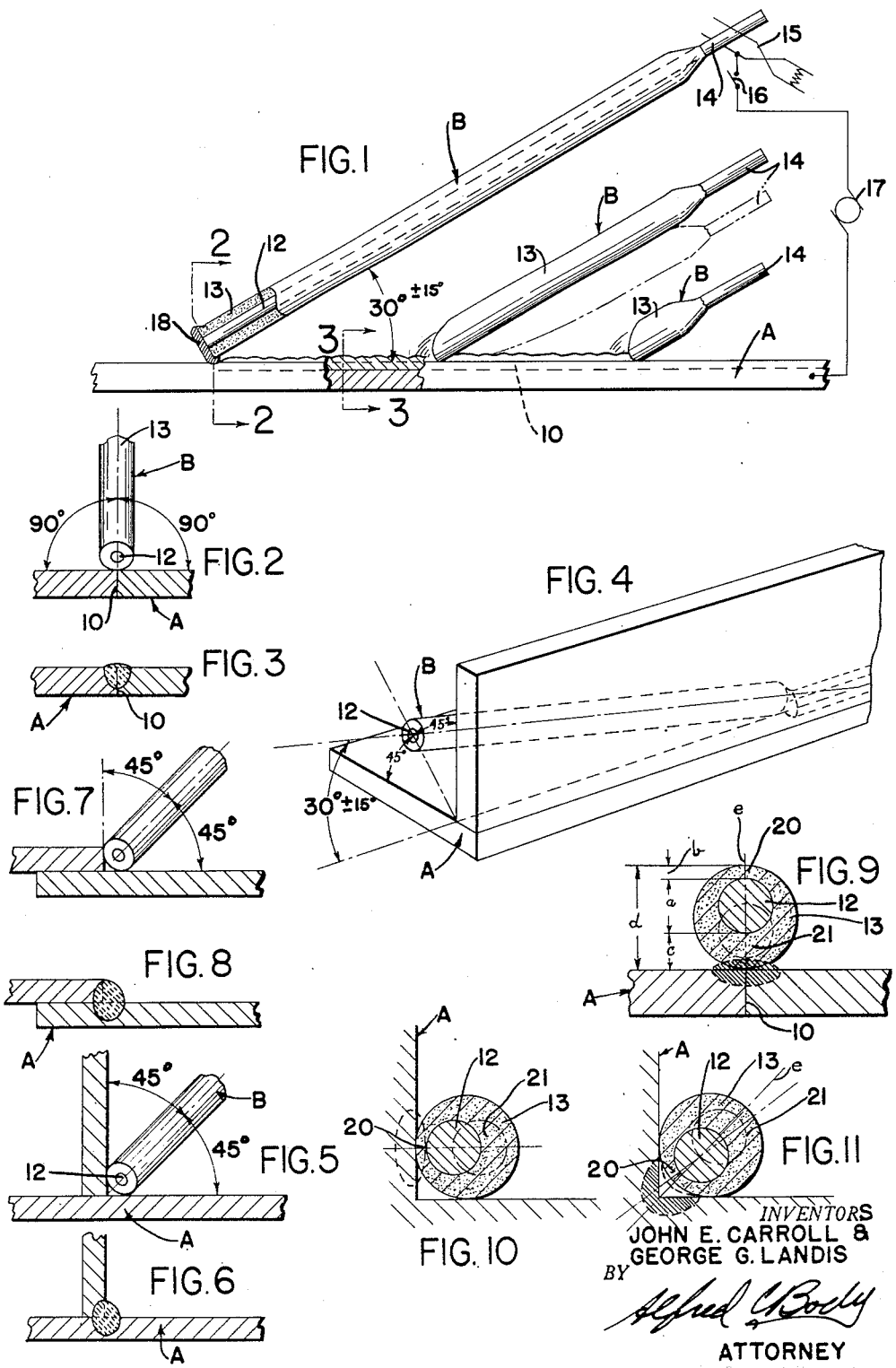

2,810,064

ARC-WELDING ELECTRODE AND METHOD OF ARC WELDING

George G. Landis and John E. Carroll, South Euclid, Ohio, assignors to The Lincoln Electric Company, Cleveland, Ohio, a corporation of Ohio Application April 26, 1954, Serial No. 425,376

10 Claims. (Cl. 219—137)

This invention pertains to the art of electric arc welding and, more particularly, to an arc-welding electrode and method of electric arc welding.

In the art of arc welding, it is conventional to hold an electrode at an angle relative to the weld seam of between approximately 60 to 90 degrees. The electrode end electrically energized relative to the workpiece is then lightly touched to the workpiece and withdrawn to strike the arc. If the initial contact is too heavy or if the electrode is not properly drawn back away from the workpiece, either a spot welding of the electrode end to the workpiece results or the arc will go out. Furthermore, the operator has extreme difficulty in touching the electrode to the workpiece at the exact point where he desires to commence the welding operation. Prior to the striking of the arc, he must shield his eyes with a lens which is, to all intents and purposes, completely opaque prior to the striking of the arc. Thus, the electrode must be touched to the workpiece with the operator, in effect, completely blind.

If the electrode end is first touched to the workpiece and then electrically energized, it is possible to accurately locate the electrode end without the impediment of the opaque lens. However, the tendency in such a case is for the electrode end to spot weld to the workpiece rather than to properly strike the arc. In the alternative, the arc goes out when the welding operator attempts to pull the electrode away from the workpiece after it partially spot welds thereto.

In any event, the proper initiation of the electric arc requires a skilled welding operator.

After the arc is struck, the welding operator must maintain the proper electrode workpiece spacing while advancing the electrode toward the workpiece as the electrode end burns off. Also, the electrode is advanced along the weld seam to deposit a continuous weld bead. In addition to these two movements, the welding operator must slightly oscillate the end of the welding electrode relative to the length of the bead so as to properly control the width of the welding bead laid down and melt down both edges being welded. Coordinating these three movements and the spacing also requires a highly skilled welding operator.

A particular skill in the oscillating movement is required whenever there is a gap between the edges to be welded or where a corner or fillet is to be welded. The electric arc serves the dual purpose of both melting the workpiece along the seam and melting off the electrode end so that the molten metals intermix and form a homogeneous weld bead. It has been determined that there is at one time only one arc which exists between the electrode end and the workpiece and this arc normally goes across the shortest path from the electrode end to the workpiece. Unless the electrode end is oscillated with spaced edges, the arc goes only to one edge. With a fillet weld, the electrode cannot be pushed all the way down into the corner and the arc goes to only one of the surfaces at a point spaced from the corner. In the alternative, the arc may weld along one edge or surface for a short distance and then jump across to the other edge or surface.

In either event, as there is no common pool of molten metal simultaneously on both edges or surfaces with which the melted off electrode can intermix, a good weld bead does not result. This problem is overcome by oscillating the electrode end but, as pointed out, this requires operator skill.

The problem becomes particularly apparent when the electrode, in accordance with the present invention, is positioned at an angle to the desired weld seam of less than 45 degrees and the welding operation is allowed to proceed substantially automatically by allowing the electrode end to burn back and deposit the weld bead without any manipulation of the welding electrode. Prior to the present invention, to the best of our knowledge, it has been impossible to properly effect the weld bead with the electrode so positioned when the edges to be welded are in even slightly spaced relationship or when a corner or fillet is to be welded.

The present invention contemplates an arc-welding electrode and method of welding wherein the electrode may be held stationary relative to the workpiece during a welding operation and good welds may be obtained by even the most inexperienced of welding operators.

In accordance with the present invention, an electrode is provided comprised of a metallic core and an outer coating, the coating being of the type wherein at least a portion of the deposited weld metal will come from the coating. As such, the coating may contain large percentages of powdered metal or metallic alloys or compounds of such metals which will melt down or reduce to the metal in the heat of the welding arc to become part of the weld bead. Such coatings are oftentimes electrically conductive. However, in accordance with the invention, such coating must be electrically nonconductive from its outer surface to the core. By electrically nonconductive is meant a coating such that if the sides of the electrode are laid, pressed or rubbed against a metallic surface energized relative to the core with a voltage generally equal to open-circuit voltages normally employed in welding; that is, around 100 volts, the electrode will not fire or strike an arc through the coating. Either the coating per se may be nonconductive or an outer insulating covering may be placed over a coating which in and of itself is electrically conductive.

Further, in accordance with the invention, a method of arc welding is provided wherein a coated arc-welding electrode of the general type just described is laid or positioned either parallel to or at an acute angle of less than 45 degrees to the surface of the workpiece with the arc end touching the workpiece and, if an eccentric coating is employed, with the bisecting plane of the electrode extending generally through the center line of the desired weld bead, energizing such electrode to establish a welding arc and holding such electrode against movement either transverse to or longitudinally of the length of the weld bead and with the arc end thereof in contact with the workpiece until the weld bead is completed.

In some instances, the electrode is pressed directly toward the workpiece. In such event, the electrode may bend to an arcuate form, being tangent or almost tangent to the workpiece at or adjacent to the arc end.

During the entire welding operation, the electrode coating accurately spaces the end of the core wire from the workpiece and thus determines the arc voltage, an important thing in hand welding.

Obviously, if the electrode is positioned at the maximum angle indicated, some movement of the electrode is required as the electrode burns off so as to maintain its arc end in contact with the workpiece. Such movement is either a movement of the entire electrode directly toward the workpiece while maintaining the original angle or a rotation of the electrode about its length or a combination of both, generally the latter.

Using the present invention, welds can be obtained by inexperienced or amateur welders superior in appearance to those made by the most skilled of welders employing conventional methods and electrodes.

Also, in accordance with the invention, the electrode must contain a predetermined and proper amount of weld metal per unit length so as to automatically deposit without movement of the electrode the amount of metal per unit length of weld bead required for good welds in the thickness of sheet being welded. A portion of this weld metal per unit length must be contained in the coating.

The reasoning for this is that for the welding of thin plates, to which the present invention is particularly applicable, the amount of electrical energy per unit length of weld supplied by the arc is quite critical. Two much energy will burn a hole through the plate. Too little energy will not properly fuse the metal of the plate.

To supply this critical amount of energy with the conventional coated rods is quite difficult. Normally, an electrode requires a weight of coating equal to about 25 percent of the weight of the metal in the core wire. This coating provides a protective slag over the deposited weld bead. With such a weight requirement, the coating is relatively thin.

With a thin coated rod, the amount of electrical energy per unit length of weld supplied is almost directly proportional to the core wire diameter. In other words, the amount of energy supplied per unit length is completely independent of the arc current.

The reason for this is clear when it is realized that if the arc current is increased, the rate of energy supply is obviously also increased. The electrode, however, burns back at a proportionately faster rate and this increased rate of energy is then supplied for a proportionately less time. The result is a constant supply of energy per unit length of weld.

It has been found that there is one optimum value of core wire diameter for each thickness of plate to be welded. The diameter is quite critical. Thus, a welding operator would be required to stock an infinite number of electrode wire sizes to take care of all the plate thicknesses which he might desire to weld. Also, some skill is required to match the core wire diameter to the plate thickness.

It will be appreciated that this rate of energy input per unit length of weld becomes important where the end of the electrode is to be maintained in contact with the workpiece and the electrode is not to be moved along the workpiece during the weld as described above. In conventional welding operations, the skilled welding operator provides for these conditions by controlling the spacing of the end of the electrode from the workpiece and by the speed with which he advances the electrode along the workpiece. These two factors are adjusted by the skilled welding operator, depending upon the appearance of the weld crater as seen through the welding lenses. The present invention is intended to be employed wherein it is not necessary to in any way observe the weld pool or the welding operation while it is taking place.

A rod with a heavy refractory coating has been found to enable a variation in the arc current to provide a slight control over the energy input to the workpiece but such a rod provides far more slag over the weld than is necessary for good welds and is, therefore, quite uneconomical.

Employing a coating wherein at least a portion of the deposited weld bead comes from the coating itself, a heavier or thicker coating is inherently required. The optimum amount of slag can thus be provided in the coating. Further, when the coating contains some of the weld metal itself, it has been found that the amount of energy supplied per unit length of weld can be readily controlled by controlling the arc current.

Thus, in accordance with the invention, the coating may contain substantial amounts of a powder of the metal alloy which it is desired to have deposited in the ultimate weld bead. For welding steel, ordinary steel powder may be used in amounts totaling between 20–30 percent of the total weight of weld metal in the electrode, the amount of slag-forming ingredients being in the region of 20–30 percent of the total weight of weld metal.

Alternatively, the electrode coating may be comprised of a substantial amount of a compound of the metal which it is desired to have deposited in the weld bead, plus an active reducing agent and a fluxing agent for such compound. In the case where steel is to be welded, the coating will be made up of iron oxide in amounts such that the available iron in the coating will equal between 15–25 percent of the total weight of iron in the rod; that is, the weight of the available iron in the coating plus the weight of the core; a reducing agent such as FeSi or the equivalent in amounts less than the stoichiometric amounts and a fluxing agent such as $SiO_2$ or the equivalent, e. g. oxides of titanium and aluminum in amounts such that the total of the reducing agent and fluxing agent will be in excess of the stoichiometric amounts with the oxides. Such oxides may be in the form of mill scale, iron ore either as mined or partially reduced or otherwise. FeMn is also desirably included in the coating. Such a coating, while particularly adapted for use with the above described methods of arc welding, is also useable with conventional methods of welding as initially described herein wherein the operator must manipulate the electrode or drag it along the workpiece.

The principal object of the invention is the provision of a new and improved arc-welding electrode and coating therefor which is simple and easy to use, relatively inexpensive to manufacture and which enables the obtaining of sound weld beads by inexperienced welding operators.

Still another object of the invention is the provision of a new and improved arc-welding electrode which can be laid at an angle of from 0 to 45 degrees relative to a workpiece and can deposit good weld beads even into the corners of fillets or when the edges to be welded are in slightly spaced relationship.

Still another object of the invention is the provision of a new and improved arc-welding electrode which gives to the welding operator a handle or control for directing the welding arc.

Another object of the invention is the provision of a new and improved arc-welding electrode which need not be manipulated in any way during the course of a welding operation.

Still another object of the invention is the provision of a new and improved coating for coated arc-welding electrodes which uses inexpensive ingredients in the coating and, yet, a portion of the deposited weld metal comes from the coating itself.

Still another object of the invention is the provision of a new and improved method of arc-welding whereby an inexperienced welding operator may deposit good, sound weld beads.

Another object of the invention is a new and improved method of arc welding wherein the energy input per unit length of weld bead may be readily controlled by controlling the current.

The invention may be embodied in certain coated weld-rod constructions, certain coating compositions and certain steps of arc welding, preferred embodiments of which will be described in detail in this specification and illustrated in the accompanying drawing which is a part hereof, and wherein:

Figure 1 shows a side elevational view partly in section of an arc-welding electrode in operative relationship with a workpiece being welded showing the electrode in various stages of completion of the welding;

Figure 2 is a sectional view of Figure 1 taken approximately on the line 2—2 thereof;

Figure 3 is a cross-sectional view of Figure 1 on the line 3—3 thereof showing the cross section of the completed weld;

Figure 4 is a perspective view of an arc-welding electrode effecting a weld on a butt joint and showing the relationship of the electrode to the various surfaces;

Figure 5 is a cross-sectional view of Figure 4;

Figure 6 is a similar view to Figure 5 but showing the completed weld;

Figure 7 is a cross-sectional view of an electrode positioned for effecting a weld on a lap joint;

Figure 8 is a view similar to Figure 7 but showing a completed weld; and

Figures 9 to 11 are cross-sectional views of an electrode constructed in accordance with an alternative embodiment of the invention and illustrating how the position of the weld bead may be controlled by orienting the electrode about its axis.

Referring now to the drawings wherein the showings are for the purposes of illustrating the invention only and not for the purposes of limiting same, Figure 1 shows a workpiece A having edges 10 to be welded and an electrode B in operative welding position in accordance with the invention. This electrode B is comprised generally of a central core 12, a surrounding coating 13 covering essentially the entire length of the core 12 but stopping short of the right-hand end as viewed in Figures 1 and 2 to leave an exposed end 14. An electrode holder shown schematically at 15 grasps this exposed end 14 and is connected through a switch 16 to one terminal of a source of arc-welding current 17. The opposite terminal of this source is, as shown, connected to both pieces which form the workpiece A.

The workpiece A forms no part of the present invention and may be made of any known or desired metallic material which it is desired to weld together. The edges 10, while shown abutting, can be in slightly spaced relationship. The electrode and method of welding of the present invention enables satisfactory welding of either.

The arc-welding power source 17 may be either an A. C. or D. C., or a combination of the two, power source. The present invention appears to work equally satisfactory with either. An A. C. power source is preferred, however.

The electrode B is provided on the end opposite from the bared portion 15; that is, the arc end of the electrode, with a match-tip 18 to assist in the starting of the electric arc, with the electrode in the position shown in Figure 1.

The match tip 18 generally consists of an organic binder material having embedded therein a plurality of fine steel particles which serve as a conducting path from the sides of the electrode coating 13 to the end of the core wire 12. Such match tip 18 quickly initiates an arc between the end of the core wire 12 and the workpiece A when open-circuit voltages of the type normally employed in arc welding are interposed on the core 12 and the workpiece A.

The switch 16 may be located in any desired position but, preferably, is an integral part of the electrode holder 15 whereby the welding operator may position the electrode by grasping the electrode holder with one hand and then electrically energize the electrode using the same hand.

Thus, to effect a weld, the electrode B is positioned with the match tip 18 touching the workpiece at the point where it is desired to start the weld bead and the electrode extending therefrom either parallel to the surface of the workpiece or at an angle less than 45 degrees relative thereto, the electrode being in the plane of the desired weld bead. The switch 16 is then closed, thus energizing the electrode. The arc immediately starts and a weld bead progresses, the welding operator at all times pressing the end of the electrode as it burns off into engagement with the surface of the workpiece A. The coating 13, during this operation, spaces the core wire 12 from the workpiece. When the weld is completed, the operator simply removes the electrode from contact with the workpiece and the arc automatically goes out.

The electrode core 12 is a wire of the material which it is desired to have deposited in the weld bead and forms no part of the present invention. Normally, for welding steels, the core 10 will be made of ordinary low-carbon steel. As shown, the cross-sectional shape of the core 12 is cylindrical, although it, obviously, may be other shapes and, in Figure 3, this core is indicated as having a diameter $a$. The optimum diameter of the core wire will be hereinafter discussed.

The preferred embodiment contemplates two types of coating 13 which will fulfill the requirements of the invention. Thus, the coating may contain substantial amounts of the metal which it is desired to have in the weld bead; e. g., steel or iron, both in the form of a powder, or it may contain compounds of the metal plus a reducing agent which will reduce the compound to the desired base metal in the heat of the electric arc.

One embodiment of a coating found satisfactory for use with the invention is thus described in the copending application of Robert C. Schutt, Serial No. 441,181 filed July 2, 1954, to which reference is made for a more complete description of the formulation of the coating. Generally, it can be stated that the coating contains iron or steel powder in amounts of from 30 to 50 percent of the weight of the coating and from 25 to 45 percent of the total weight of metal in the electrode.

A specific example in parts by weight is as follows:

| | |
|---|---|
| Iron powder | 40 |
| $TiO_2$ | 20 |
| Kaolin | 4 |
| Mica | 5 |
| Gum cellulose | 1½ |
| FeMn (high carbon) | 5 |
| $Na_2SiO_3$ | 9½ |
| $K_2SiO_3$ | 9½ |

The other type of coating which has been found to be satisfactory with the invention contains generally an oxide of the metal which it is desired to have deposited, such oxide in the case of iron being iron oxide in any of its many forms. Mill scale has been found to be satisfactory. The coating also contains a reducing agent for the oxide of the metal which, in the case of iron oxide, is preferably ferrosilicon. Such reducing agent normally is present in amounts at least silghtly below the stoichiometric amount. This is to insure that the reducing agent per se will not be found in the final weld bead. However, with the reducing agent in amounts below the stoichiometric amount, it is then possible that the oxide of the metal will be found in the weld bead which is equally undesirable. Thus, the invention contemplates providing the coating with a fluxing agent such a quartz in amounts which when taken with the reducing agent will be in excess of the stoichiometric amount. Thus, with steel, the coating will contain iron oxide in amounts whereby the available iron in the coating will equal between 12–25 percent of the total weight of iron in the electrode, ferrosilicon in amounts less than the stoichiometric amount and quartz in amounts so that when considered with the ferrosilicon, the two will be present in amounts in excess of the stoichiometric amount. It will be appreciated that the quartz being an excellent solvent for iron oxide will clean up any excess iron oxide after the ferrosilicon has acted thereon which quartz, with the dissolved iron oxide therein, will appear as a slag on top of the weld bead.

Ferromanganese also is desirably used in the coating, it appearing to act as a catalyst to assist the action of the ferrosilicon in reducing the oxide of iron.

Generally, the coating should include the following ingredients:

| | Percent |
|---|---|
| Iron or compound of iron; e. g., $Fe_3O_4$ | 40–60 |
| FeSi | 7–13 |
| FeMn | 2–6 |
| $SiO_2$ | 3–5 |
| Rutile | 0–10 |
| Binder; e. g., $Na_2SiO_3$, if necessary | 0–35 |
| Bentonite | 8–15 |

In a preferred embodiment of the invention, the coating is comprised of the following ingredients in parts by weight:

| | |
|---|---|
| Iron oxide in the form of mill scale | 55 |
| Ferrosilicon | 10 |
| Ferromanganese | 4–6 |
| Silicon dioxide | 5 |
| Rutile | 6 |
| Sodium silicate binder and extruding agent | 30 |

The first three compounds listed all provide some available amounts of iron for the weld bead. Calculations show that approximately 43% of this coating is available iron. Iron powder as such may be in part substituted for the iron oxide.

Such coating is extruded onto the core 12 using conventional extrusion methods in such thicknesses that the coating when dried will equal approximately 50 percent of the finished electrode. The coating is baked but, preferably, at a slightly higher temperature than normal so that no moisture content will be allowed to remain in the coating. Five hundred degrees Fahrenheit is preferred for a time period such that the retained moisture measured at 2000° F. will be less than one percent. The proportions stated are subject to variations and to the substitution of equivalents.

This coating is electrically nonconductive so that during the welding it serves to space the core wire from the workpiece and, additionally, determines the arc voltage and holds it uniform without skill on the part of the operator.

In operation, the ferrosilicon reduces the iron oxide to pure iron and ferrosilicate. A small amount of iron oxide is left over from this reaction, which iron oxide is absorbed in the molten silicon dioxide in a manner as is known in the art to form iron silicate. The reduced iron resulting from the above reaction commingles with the molten iron from the core wire 12 and forms part of the final weld bead. The iron silicate appears in the slag along with the rutile and binders.

To use the electrode, the welding operator must first select the proper size electrode and then proper welding current for the thickness of metal plate to be welded. The welding operator first determines the gauge of the metal plate to be welded. Having determined the gauge of the metal, he may determine the diameter of the core wire 12 and the optimum welding current range from the following table:

| Gauge | Decimal Equivalent, Inches | Core Diameter, Inches | Optimum A. C. Current Range, Amperes |
|---|---|---|---|
| 20 | .036 | 1/16 | 45–50 |
| 18 | .048 | 1/16–5/64 | 60–70 |
| 16 | .060 | 5/64 | 70–75 |
| 14 | .075 | 5/64–3/32 | 80–90 |
| 12 | .105 | 3/32 | 90–100 |

The power source is adjusted to provide the optimum current range indicated. Obviously, these current values may vary from that stated, depending upon various conditions. Thus, if the weld bead should penetrate too deeply into the workpiece W, the current should be reduced. Because of the present invention, such variation in current will effect a reduction in the energy input to the workpiece per unit length of weld.

The electrode B is then positioned at an angle of approximately 30 degrees to the surface of the workpiece A and so as to be included in a plane through the line of the weld bead. Generally, it may be said that this plane will bisect the total included angle between the surfaces being welded. In the case of a workpiece as shown in Figures 1 and 2 wherein a butt weld is being effected, the angle from this plane to the surface of the workpiece will be 90 degrees.

The angle of the axis of the electrode to the desired line of the bead is preferably 30 degrees. It may vary in some instances to 45 degrees but, in general, it must not be greater than 45 degrees. Thirty degrees has been found to be quite satisfactory and the angle may be made less than this down to and including zero degrees; that is, where the electrode is parallel to the desired line of the weld bead.

The match tip 18 is positioned on the line of the weld bead at the point where it is desired to commence welding. As the switch is open, it will be appreciated that this tip can be located without the need for a welding lens to shield the operator's eyes. After the electrode has been properly located, the operator can either shut his eyes, turn his head away or place the welding lens between his eyes and the workpiece. The switch 16 may then be closed to electrically energize the core wire 12. The arc is immediately struck because the tip 18 forms a conductive path from the core wire 12 to the workpiece A. The arc burns off the end of the electrode and, as it does so, the electrode is moved in a direction directly toward the workpiece A. In no instances must the electrode be moved in a direction parallel to the surface of the workpiece A. This relationship is clearly shown in Figure 1 wherein the bared portion 14 is always shown in the same vertical relationship. If the electrode is moved horizontally along the workpiece, a weld bead having an insufficient amount of metal or an excessive amount of metal, depending upon which direction the electrode is moved, will result. In this respect, it will be noted that the available metal in the electrode is made up of the metal of the core wire 12 and the available metal in the coating 13 which is proportioned to be just sufficient to provide the right amount of metal for the desired shape of weld bead.

It will be appreciated that the electrode B could be energized relative to the workpiece before touching the tip 18 to the workpiece. In this event, however, the operator must either shield his eyes or turn his head away before touching the tip 18 to the workpiece, and locating the tip 18 at the exact desired point on the workpiece will be difficult.

It will be appreciated that anyone that can read a table and can estimate or measure the thickness of metal plate can effect a proper weld using the present invention. Once given the proper size electrode and the proper welding current, a blind man can make a good high-quality weld.

Figure 4 shows the relationship of the axis of the welding electrode to a workpiece when it is desired to effect a fillet weld. As shown in Figure 4, the electrode is positioned on a plane which bisects the included angle between the surfaces forming the corner or fillet to be welded. In Figure 4, these surfaces are at 90 degrees and the electrode is positioned at an angle of 30 degrees relative to the desired line of the weld bead and at an angle of 45 degrees relative to the surfaces of the plate. Thereafter, the welding operation may proceed as described with reference to Figure 1. The welding operator simply continues to push the arcing end of the electrode toward the corner or fillet as the electrode burns away.

It will be appreciated that as the electrode welds, the core wire 12 will heat to some extent due to the high electric current passing therethrough and will soften. The electrode, in some instances, assumes the arcuate shape shown in dotted lines in Figure 1. Notwithstanding this fact, satisfactory welds can still be obtained.

In all instances, during the welding operation, the coating 13 serves to space and insulate the core wire 12 from the workpiece.

Figure 7 shows the relative position of the electrode when welding a lap joint. In general, it may be said that a lap joint shown in Figure 7 is simply a special case of the fillet joint of Figure 4. In any event, the electrode is positioned on the plane which bisects the angle between the surfaces forming the corner or fillet to be welded.

Using the present invention, a weld bead is obtained which is extremely uniform having the appearance of the best automatic weld and far superior to that obtainable by ordinary hand welding by the most skilled operators.

Figures 9 to 11 show an alternative embodiment of the invention which enables the center line of the weld bead to be relatively controlled by rotating the electrode about its longitudinal axis.

In this embodiment of the invention, the surface of the core wire 12 is eccentric to the surface of the coating 13. The coating has a thin side 20 having a thickness $b$ and a thick side 21 having a thickness $c$. The over-all dimension or diameter of the electrode has a dimension $d$. The electrode is symmetrical about a bisecting plane $e$ which, as shown in Figure 9, extends vertically through the cross section of the electrode and is also symmetrical with the edges 10.

In use, the electrode is always positioned relative to the desired weld seam so that the bisecting plane extends generally through the center line of the desired weld bead.

Figure 9 shows the bisecting plane $e$ so oriented relative to the workpiece A that the thick side 21 of the coating is positioned adjacent to the workpiece. In Figure 10, the thin side 20 is shown as being adjacent to the workpiece A. In either event, it has been found that the center line of the weld bead; particularly, when welding horizontal surfaces, can be directed by simply rotating the electrode B about its axis and, thus, orienting the bisecting plane $e$ relative to the surface. This is clearly shown in Figures 10 and 11. In Figure 10, the electrode is shown as depositing a weld on the vertical surface. In Figure 11, the bisecting plane $e$ has been rotated through approximately 45 degrees and is shown as depositing a weld bead in the fillet or corner.

The prime difference between welding with either the thin side 20 or the thick side 21 of the coating adjacent to the workpiece is in the voltage across the arc. Thus, when the thin side 20 is adjacent to the workpiece as is shown in Figure 10, a lower arc voltage will exist than when the thick side 21 is adjacent the workpiece as is shown in Figure 9.

Because of this eccentricity, it will be apparent that the welding operator has a handle whereby he can actually direct the location of the weld bead simply by rotating the electrode about its axis. In a like manner, a ready control is obtainable on the arc voltage.

The coating containing the iron oxide is believed new per se. It is particularly adaptable to the above described method of welding. It has been found useable, however, for normal hand-held welding operations wherein the electrode is held at an angle relative to the workpiece of 45 degrees or more and the welding operator actually spaces the end of the electrode from the workpiece manually. The coating has one particular advantage in that it provides iron for the weld bead which is very cheap to buy. Thus, mill scale may be purchased at a price of between one and three cents per pound. Steel wire of the type used for the core costs in excess of 15 cents per pound. By providing a coating wherein approximately 22 percent of the deposited weld metal comes from the coating, a substantial saving in the cost of the electrode can be effected.

In some instances, the bared end 14 of the electrode may be bent relative to the arcs of the electrode so that the electrode holder will not strike the workpiece and interfere with the welding operation as the electrode burns off to a short length.

Thus, it will be seen that embodiments of the invention have been described in detail which accomplish all of the objects of the invention heretofore set forth and others and which enable good welds to be obtained without the exercise of any skill on the part of the welding operator. In fact, welds superior to those made by the most highly skilled welding operators have been obtained by novices after having been shown how to hold the electrode relative to the workpiece.

The invention has been described with particular reference to preferred embodiments. Obviously, modifications and alterations will occur to others upon a reading and understanding of this specification and it is our intention to include all such modifications and alterations insofar as they come within the scope of the appended claims.

Having thus described our invention, we claim:

1. An arc-welding electrode comprised of a core and a surrounding coating, said core being of the metal which it is desired to deposit, said coating including an oxide of said metal in excess of 40% of the weight of said coating and a reducing agent therefor in approximate stoichiometric amounts.

2. An arc-welding electrode comprising a central core of the metal which it is desired to deposit as a weld bead and a coating surrounding said core comprised of an oxide of said metal in an amount in excess of 40% of the weight of the coating, a reducing agent therefor and a solvent for said oxide, said reducing agent and solvent being present in combined amounts at least greater than the stoichiometric amount required to react with said oxide.

3. An arc-welding electrode comprising a steel core and a surrounding coating, said coating including iron oxide in an amount greater than 40% of said coating, a reducing agent selected from the class of ferrosilicon ferro manganese and aluminum and a fluxing agent selected from the class of the oxides of silicon, titanium and aluminum, said reducing agent being present in amounts less than the stoichiometric amount for combining with said iron oxide and said fluxing agent being present in amounts to at least dissolve the remaining amounts of iron oxide.

4. An arc-welding electrode comprising a steel core and a coating comprised of iron oxide in amounts from 40 to 60 percent, ferrosilicon in amounts from 7 to 13 percent, silicon dioxide in amounts from 3 to 5 percent, the balance being conventional weldrod coating materials.

5. The combination of claim 4 wherein said coating has a weight approximately equal to said core wire.

6. The combination of claim 4 wherein said coating also contains ferromanganese in amounts of from 2 to 6 percent.

7. An arc-welding electrode comprised of a steel core wire, and a coating therearound having a weight approximating the weight of said core wire and a composition in parts by weight approximately as follows: Iron oxide, 55; FeSi, 10; FeMn, 4–6; silicon dioxide, 5 and rutile, 6.

8. A method of depositing a weld bead on a steel workpiece comprising providing a steel core with a surrounding insulating coating of a weight approximately equal to said core and containing available iron in approximate amounts of from 15 to 30% based on the total amount of iron in the electrode, the balance being slag forming ingredients positioning said electrode at an angle from 0 to 45 degrees relative to the desired weld bead and in the plane thereof so that said coating spaces said core from said workpiece, initiating an arc between the core and the workpiece to burn back said electrode and holding the electrode end in contact with the workpiece while it burns back without any intentional longitudinal or transverse movement of the electrode relative to the weld seam.

9. An arc welding electrode comprised of a central core of steel and a surrounding coating having a total weight of between 40% to 60% of the total weight of the electrode and the following approximate composition: iron and oxide of iron 40–60%, ferrosilicon 7–13%, ferromanganese 2–6%, silicon dioxide 3–5%, rutile 1–10%, sodium silicate binder 1–35%, bentonite 8–15%.

10. A method of electric arc welding a steel workpiece using an electric arc, comprising providing a steel wire, positioning such wire at an angle from 0–45 degrees relative to the desired weld bead and in the plane thereof, initiating an arc between said wire and the workpiece to burn back said wire without any intentional longitudinal or transverse movement of the wire relative to the weld seam, and simultaneously and continuously spacing the end of the wire from the workpiece with an insulating coating of a thickness approximating one half the diameter of the wire and a weight per unit length approximately equal to the weight per unit length of said wire, said coating containing available iron in amounts of from 15 to 30% based on the total amount of iron in the electrode with the balance being made up of slag forming ingredients, the arc continuously melting the wire and the available iron in the coating.

References Cited in the file of this patent

UNITED STATES PATENTS

| | | |
|---|---|---|
| 1,312,254 | Jones | Aug. 5, 1919 |
| 1,441,685 | Jones | Jan. 9, 1923 |
| 1,467,825 | Armor | Sept. 11, 1923 |
| 1,599,056 | Lloyd et al. | Sept. 7, 1926 |
| 1,745,267 | Pennington | Jan. 28, 1930 |
| 1,905,081 | Woods | Apr. 25, 1933 |
| 1,905,648 | Notvest | Apr. 25, 1933 |
| 1,953,942 | Applegate | Apr. 10, 1934 |
| 1,993,789 | Johnston | Mar. 12, 1935 |
| 1,996,794 | Deppeler | Apr. 9, 1935 |
| 2,037,596 | Schaub | Apr. 14, 1936 |
| 2,163,439 | Somerville | June 20, 1939 |

UNITED STATES PATENTS

| | | |
|---|---|---|
| 567,867 | Great Britain | Mar. 6, 1945 |